United States Patent [19]
Nakano et al.

[11] Patent Number: 5,220,620
[45] Date of Patent: Jun. 15, 1993

[54] COLOR IMAGE DATA PROCESSING APPARATUS

[75] Inventors: Yasuhiko Nakano, Atsugi; Shigeru Yoshida, Ebina, both of Japan

[73] Assignee: Fujitsu Limited, Kawasaki, Japan

[21] Appl. No.: 887,670

[22] Filed: May 26, 1992

Related U.S. Application Data

[63] Continuation of Ser. No. 593,953, Oct. 9, 1990, abandoned.

[30] Foreign Application Priority Data

Oct. 9, 1989 [JP] Japan .................. 1-263676

[51] Int. Cl.$^5$ .............................................. G06K 9/36
[52] U.S. Cl. ........................... 382/17; 382/54; 358/80
[58] Field of Search ............. 382/1, 17, 52, 54; 358/75, 80, 461, 463, 464, 475, 36; 364/734; 395/131

[56] References Cited

U.S. PATENT DOCUMENTS

| | | | |
|---|---|---|---|
| 4,054,786 | 10/1977 | Vincent | 364/734 |
| 4,516,155 | 5/1985 | Hennig et al. | 358/80 |
| 4,583,184 | 4/1986 | Murase | 364/734 |
| 4,782,384 | 11/1988 | Tucker et al. | 358/80 |
| 4,805,016 | 2/1989 | Kato | 358/80 |
| 4,819,077 | 4/1989 | Kikuchi et al. | 358/80 |
| 4,956,704 | 9/1990 | Yamada | 358/80 |
| 4,962,540 | 10/1990 | Tsujiuchi et al. | 382/17 |

FOREIGN PATENT DOCUMENTS

| | | |
|---|---|---|
| 0326429 | 8/1989 | European Pat. Off. . |
| 0375090 | 6/1990 | European Pat. Off. . |
| 2-067689 | 3/1990 | Japan . |
| 2-121069 | 5/1990 | Japan . |
| 2144302 | 2/1985 | United Kingdom ............ 358/37 |

*Primary Examiner*—David K. Moore
*Assistant Examiner*—David Fox
*Attorney, Agent, or Firm*—Staas & Halsey

[57] ABSTRACT

A color image data processing apparatus processes hue information of picture elements read out sequentially. A chromatic color detection unit is provided for detecting a chromatic color picture element series in a main scanning line having a consecutive succession of chromatic color picture elements including edge picture elements. A replacing unit is provided for replacing the hue value of each picture element of the chromatic color picture element series with a median hue value, the hue value of a picture element located approximately at the center position of the detected chromatic color picture element series. The apparatus may further have an averaged hue value switching unit for switching the hue value of each of the picture elements with an average of the hue value of the picture elements and of other picture elements located in a nearby region.

10 Claims, 15 Drawing Sheets

| | C0 | C1 | — | — | — | CN-1 |
|---|---|---|---|---|---|---|
| I0 | A0 | B0 | | | | N0 |
| I1 | A1 | B1 | | | | N1 |
| I2 | A2 | B2 | | | | N2 |
| I3 | A3 | B3 | | | | N3 |

TABLE 133

COLOR IMAGE DATA PROCESSING APPARATUS

This application is a continuation of application Ser. No. 07/593,953, filed Oct. 9, 1990, now abandoned.

BACKGROUND OF THE INVENTION

The present invention relates to a color image data processing apparatus for processing color image data, and in particular, one that can adjust the color blur of a chromatic color at a time of reading processing color image data to accurately distinguishing a character used on a color document such as an OCR (optical character recognition) slip from a colored frame.

Recent developments in office automation have brought about the handling of a colored document as document information. For instance, a character frame of a slip is printed in a different color, according to the kind of slip.

A format such as that of a character frame of an OCR for reading hand written characters is printed in a special color called a dropout color. This format is optically eliminated at a reading time so that only the character is recognized.

In other words, the character frame of an OCR slip that sets the position of the written character is printed in a dropout color that can be clearly identified by the human eye, but cannot be distinguished from the background color by an OCR sensor. The optical filter determined by the spectral characteristics of the written character color and those of the dropout color is set in front of the OCR sensor. The character frame is thereby optically eliminated when the original is read, so that only the character to be recognized is read.

However, such an existing OCR has the problem of having to select the characteristics of the dropout color and the optical filter according to the means of writing the character. Furthermore, it completely fails to use the information indigenous to the character frame, since the character frame printed in the dropout color is eliminated from the image data at a time of reading. For example, if the character frame is also recognized, the cutout in a character unit necessary for a character identification is quite easily executed. Yet, the existing OCR has the problem that it cannot use the character frame information at all. This problem becomes extremely large when an OCR slip is printed in multiple dropout colors so that it contains further effective information.

Therefore as disclosed in the Japanese patent application No. 1988-220067, this applicant proposed to extract a character according to the achromatic color value and multiple color information according to the chromatic color hue, after finding the color information of each picture element of the image data of the original in a hue, a saturation and a value and after separating an achromatic color and a chromatic color according to a saturation.

The method in this proposal is an HSV type identification method, in which an original such as a slip is read as an RGB (red, green and blue) image signal that is converted to an HSV (hue, saturation, value) signal. After an achromatic color and a chromatic color are separated by a predetermined saturation threshold, the value of the achromatic color is used for a character identification and the chromatic color is outputted as a two value image, or a multiple value image corresponding to the number of hues separated by a plurality of predetermined thresholds.

In the HSV coordinate region shown in FIGS. 1A and 1B, a background, a character, and a character frame are indicated. That is, as shown in FIG. 1A, since the background and the character are each of an achromatic color, they come into an inner solid cylindrical region of the HSV coordinate system. Furthermore, since the character frame is of a chromatic color, it comes into an outer hollow cylindrical region. After the HSV conversion, these characteristics are used first to separate the background and the character, each being of an achromatic color, from the character frame of a chromatic color by a saturation threshold. Then the background and the character are separated from the separated achromatic color by a value threshold. Meanwhile, the chromatic color is identified as a multiple value image of a predetermined color number by the predetermined thresholds for separating the hue of the representative color used on a slip, as shown in FIG. 1B.

Hence, a image reading part IR for reading an original OR such as a colored slip and a color identification part CI are conventionally set as shown in FIG. 2. The image reading part IR comprises lenses L1, L2 and L3; a red color filter RF for passing a red light through; a green color filter GF for passing a green light through; a blue color filter BF for passing a blue light through; a photoelectric element of a picture element unit, such as charge coupled devices (CCDs) C1, C2 and C3 for detecting the red, green and blue light, respectively; amplifiers A1, A2 and A3; and A/D converters ADC1, ADC2 and ADC3 for converting an analog signal to a digital signal. The color identification part CI comprises an HSV conversion circuit CONV; comparison circuits COM1, COM2 and COM3 and multiplexers MUX1 and MUX2.

In FIG. 2, the lenses L1, L2 and L3; the red color filter RF; the green color filter GF; the blue color filter BF; the CCDs C1, C2 and C3; the amplifiers A1, A2 and A3; and the A/D converters ADC1, ADC2 and ADC3 of the image reading part IR, configure three optical signal systems each for a red signal, a green signal and a blue signal. These signals read the original OR in an image signal line unit for three colors, convert the image signal in the line to a digital signal in one picture element unit, and transmit the red, green and blue signals to the HSV conversion circuit CONV via signal lines R1, G1 and B1. The HSV conversion circuit CONV converts the red, green and blue signals to S, V and H signals and outputs them.

Next, the S signal is inputted to a conversion circuit COM1 and compared with a predetermined threshold $T_S$. As shown in FIG. 1A, this threshold $T_S$ is for separating an achromatic color from a chromatic color. If the S signal is smaller than this threshold $T_S$, it is recognized as a background or a character; if the S signal is equal to or greater than this threshold $T_S$, it is recognized as a character frame. The comparison circuit COM1 outputs e.g. "0" for an achromatic color if $S<T_S$ and "1" for a chromatic color if $S \geq T_S$.

Meanwhile, the V signal is inputted to a conversion circuit COM2 and compared with a predetermined threshold $T_V$. This threshold $T_V$ is for distinguishing the value of the background from that of the character of the achromatic color. If the V signal is smaller than this threshold $T_V$, it is recognized as a black part, i.e. a character part; if the V signal is equal to or greater than this threshold $T_V$, it is recognized as the background. The comparison circuit COM2 outputs e.g. "1" for a character if $V<T_V$ and "0" for a background if $V \geq T_V$. As described above, the achromatic color part of the output signal from this comparison circuit COM2 constitutes the background and the character. This part is selected by multiplexer MUX1 controlled by the output from the comparison circuit COM1 and is outputted "as is" if $S<T_S$. However, the chromatic color part constitutes the character frame. This part is outputted as "0", transmitted to the multiplexer MUX1 and eliminated. This is similar to it being read by using a dropout color if $S>=T_S$. An output signal $S_4$ from the multiplexer MUX1 is transmitted to a character recognition part of its latter stage (not shown in the drawing).

The H signal is inputted to a conversion circuit COM3 and compared with a predetermined series of thresholds $T_H$. As shown in FIG. 1B, this series of thresholds $T_H$ comprises $T_1$ through $T_5$, which distinguish red from yellow, yellow from green, green from cyan, cyan from blue, and blue from magenta, respectively. If the H signal is smaller than threshold $T_1$, it is recognized as red; if the H signal is equal to or greater than this threshold $T_5$, it is recognized as magenta. Accordingly, as inferred from FIG. 1B, if the character frame is of one color, namely, if a format is of one color, no distinction has to be made. However, if it is of two colors, e.g. when two kinds of forms need to be distinguished, one threshold is required. If it is of three colors, two thresholds are required. Similarly, if six colors need to be distinguished, five thresholds are required. The number and value of the threshold(s) depends on the number of colors used in the slip.

Unlike multiplexer MUX1, multiplexer MUX2 outputs "as is" the outputs i.e., character frame information, from the comparison circuit COM3, when "1" is transmitted from the comparison circuit COM1, and outputs "0" to multiplexer MUX2 when "0" is transmitted from the comparison circuit COM1, i.e., $S<T_S$, in case of an achromatic color.

When the image reading part IR actually reads the original OR in color, since a flat bed type scanner is used, a position difference of about two picture elements or two lines among three colors (e.g. red, green and blue) ordinarily arises. For instance, when the RGB gradations are almost equal, the picture element is of an achromatic color; but e.g. at a character edge, the color becomes a chromatic color because color balance is lost. However, a chromatic color cannot change to an achromatic color, although the color changes e.g. at a character edge. Hence, character frame information separated as a chromatic color by the saturation threshold according to the method shown in FIGS. 1A and 1B is contaminated by the noise of another chromatic color e.g. at a character edge, and has a problem of being hard to use "as is" as character cutout information. Also, due to the color blur, it is difficult to extract the form of a specific color.

That is, in the processing method of the present proposal, accompanying the movement of the original at a reading processing time by a flat bed scanner or the like, a difference of a picture element or a difference of a few picture elements arises in the main scanning line direction and the sub scanning line direction. This causes a loss of color balance at an edge part of an image, resulting in problems such as an edge part of an achromatic color being changed to a chromatic color or an edge part of a chromatic color being changed to another chromatic color. Hence, a character and a background are not properly separated, and character frames of different colors are not properly separated.

Therefore, this applicant disclosed a new method of processing color image data for eliminating a chromatic color occurring at an achromatic color edge part in color image data, in the previously filed Japanese patent application No. 1988-275405.

The present invention is made based on the above background.

SUMMARY OF THE INVENTION

An object of the present invention is to offer a new color image data processing apparatus for eliminating a chromatic color change arising at a chromatic color edge part in color image data.

The present invention is directed to a color image data processing apparatus means for processing hue information of each picture element read out sequentially comprising a chromatic color detection means for detecting a chromatic color picture element series that is a consecutive succession of chromatic color picture elements in a main scanning line, and a replacing means for replacing the hue value of each picture element of the chromatic color picture elements series with the hue value of a picture element located approximately at a center position of the detected chromatic color picture element series.

DETAILED DESCRIPTION OF THE PREFERRED EMBODIMENTS

Figure 3:
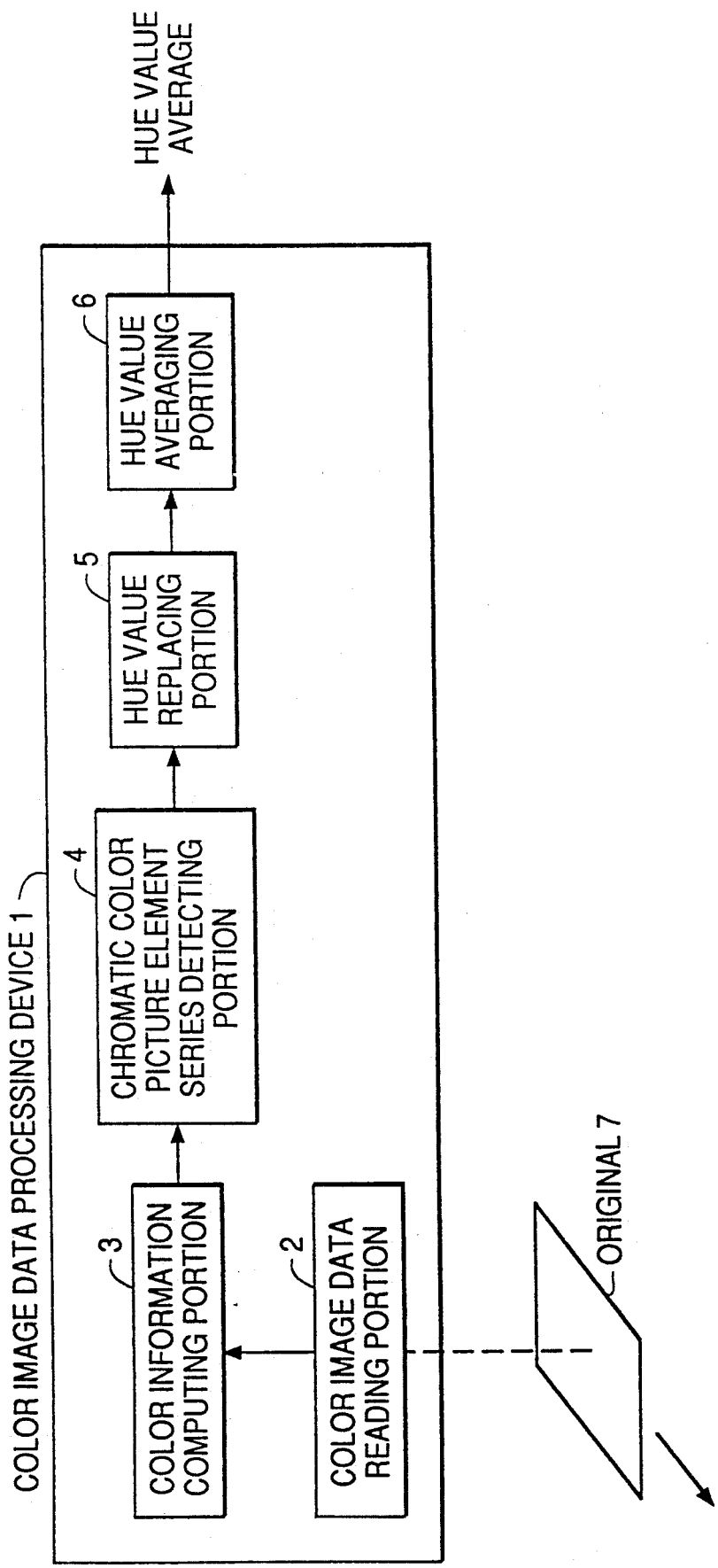
FIG. 3 is a configuration diagram of the first principle of this invention.

FIG. 3 is a configuration diagram of the first principle of this invention.

In FIG. 3, 1 is a color image data processing device equipped with this invention, comprising a color image data reading portion 2, a color information computing portion 3, a chromatic color picture element series detecting portion 4, a hue value replacing portion 5, and a hue value averaging portion 6. 7 is an original on which multiple color image data are written.

The color image data reading portion 2 optically reads out in a sequence color information of the RGB color specification system that each picture element of color image data of the original 7 owns. The color information computing portion 3 computes color information of an HSV color specification system corresponding to the color information of each picture element that the color image data reading portion 2 reads out, and outputs a corresponding hue value to a picture element of a chromatic color and a zero hue value to a picture element of an achromatic color. The hue value outputted from the color information computing portion 3 is inputted to the chromatic color picture element series detecting portion 4 that detects a chromatic color picture element series, i.e., a succession of series of chromatic color picture elements, at a main scanning line. The chromatic color picture element series detected by the chromatic color picture element series detecting portion 4 is inputted to the hue value replacing portion 5, which finds the hue value of the picture element positioned at approximately at the center of the detected chromatic color picture element series. The hue value replacing portion 5 then replaces the hue value of the detected chromatic color picture element series with this found hue value, as much as possible. The hue value outputted from the hue value replacing portion 5 is inputted to the hue value averaging portion 6, which finds the average of the hue values of each picture element and a picture element positioned in a region near the each picture element, replaces the hue value of the each picture element with this found average value of the hue value and outputs them.

In the first invention, the chromatic color picture element series detecting portion 4 detects a series of chromatic color picture elements, i.e., a succession of picture element that has the same color, at the main scanning line, by detecting a change in the hue value of the picture element being inputted from zero to a value other than zero, and a change in the hue value of the picture element from a value other than zero to zero. The picture element or a plurality thereof corresponding to an edge part of the chromatic color picture element series detected at this time often has a hue value that is different from the original hue value. Thus, the hue value replacing portion 5 adjusts the color blur of a chromatic color arising in the main scanning line direction, by finding the hue value of the picture element positioned approximately at the center of the detected chromatic color picture element series and replacing the hue value of each picture element of the detected chromatic color picture element series with the hue value of this center location.

Although the hue value is thus replaced, the picture element or the plurality thereof at an edge part in the sub-scanning line direction often have a hue value that is different from the original hue value. To eliminate color blur in this sub scanning line direction, the hue value averaging portion 6 adjusts the color blur of chromatic color occurring in the sub-scanning line direction by finding the average of the hue values of the targeted picture element that must be processed and the picture element positioned in a region near the targeted picture element by using the hue value of each of these replaced picture elements and replacing the hue value of the targeted picture element with the found average of the hue values.

Thus, the first invention eliminates a chromatic color change arising in a chromatic color edge part in the color image data.

The first invention is explained in detail referring to the embodiment of an application to an OCR system.

Figure 4:
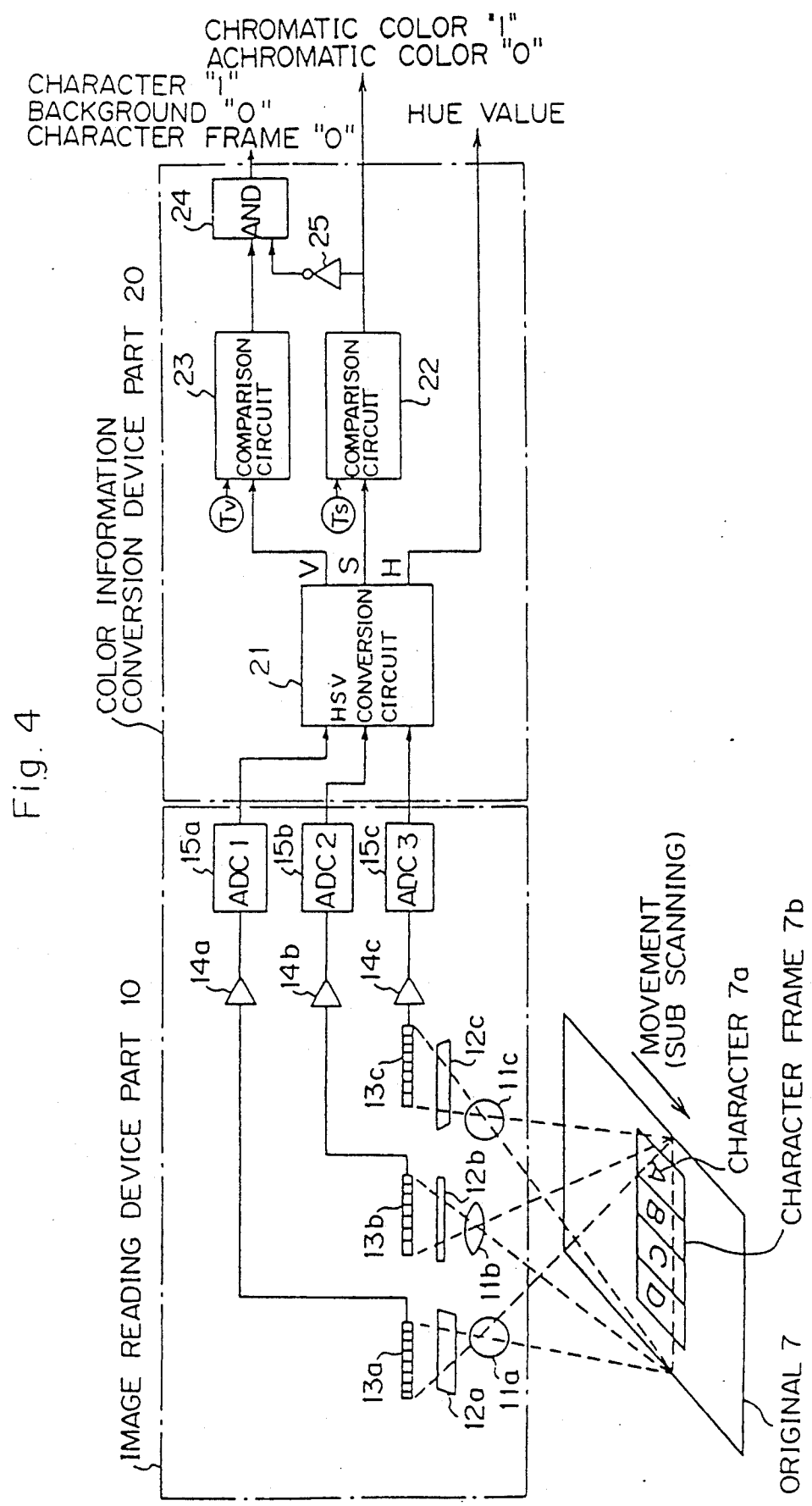
FIG. 4 shows a block diagram of a first part of a first embodiment of this invention.
Figure 5:
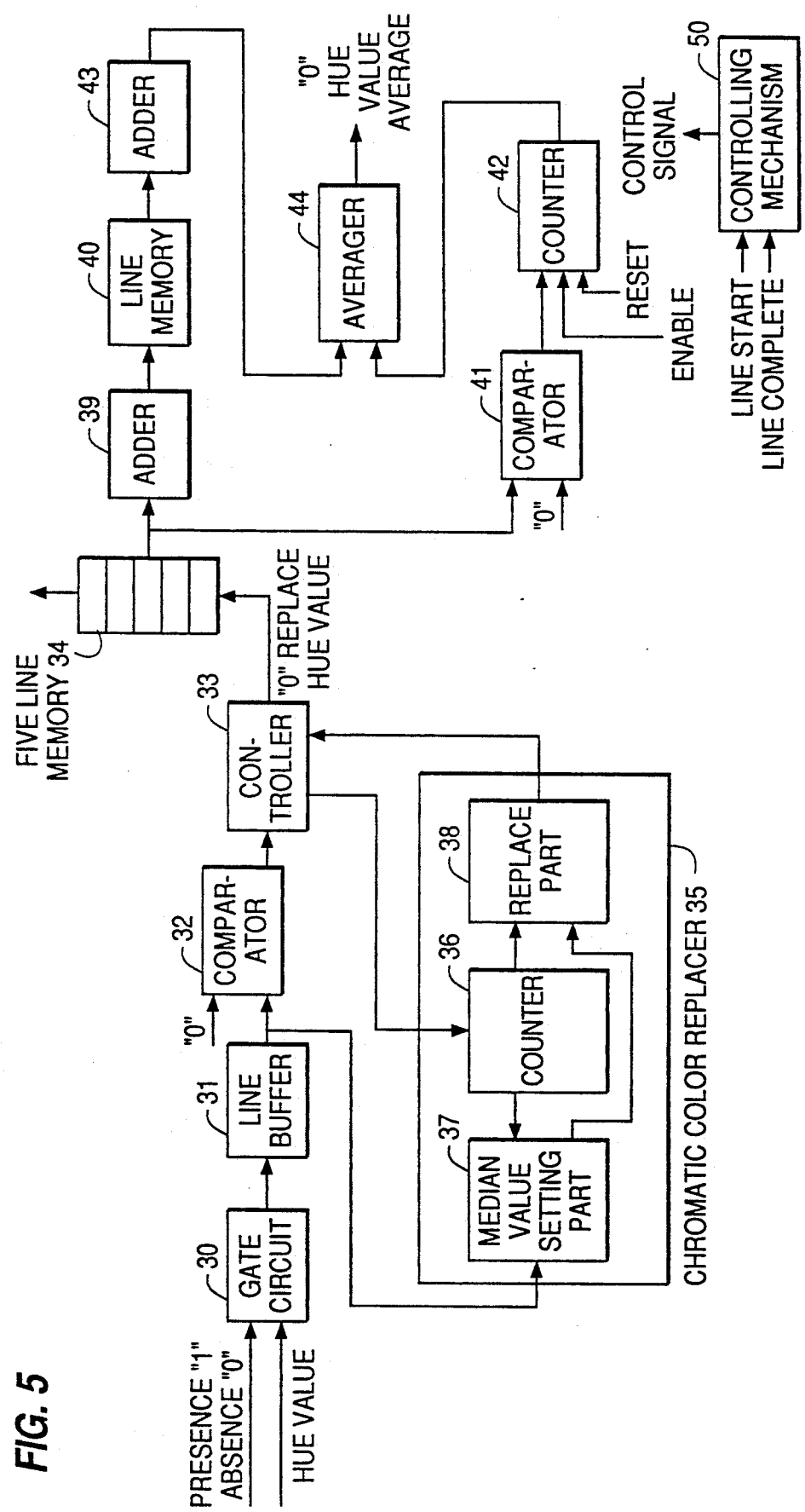
FIG. 5 shows a block diagram of a second part of the first embodiment of the present invention.

FIG. 4 shows the configuration of the hue-value reading processing part of the color image data processing device 1 related to an embodiment of this invention. FIG. 5 shows the configuration of the processing part, in the color image processing device 1, for adjusting the color blur contained in the hue value outputted from the embodiment configuration of FIG. 4.

In FIG. 4, 10 is an image reading device part that optically reads color image data comprising character 7a (written in an achromatic color of a low value) and character frame 7b (printed in multiple chromatic colors) on the original which is transmitted at a constant speed by transmitting apparatus not shown.

Like existing color image data reading devices, the image reading device part 10 sequentially reads the RGB color information of the original 7's color image data in a line unit according to three optical systems comprising three lenses 11a, 11b and 11c for an image formation; three optical filters 12a, 12b and 12c for red, green and blue, conforming to an RGB color specification system; and three line image sensors 13a, 13b and 13c for reading image data. It then converts them to digital signals with A/D converters 15a, 15b and 15c after amplifying them with amplifiers 14a, 14b and 14c, and transmits the RGB signal value of each picture element to a color information conversion device part 20.

Meanwhile, the color information conversion device part 20 finds the information on a hue, a saturation and a value of each picture element of image data read by the image reading device part 10, and separates the character 7a of the original 7 (in an achromatic color of a high value) and the character frame 7b of the original 7 from the background. After receiving the RGB signal value of each picture element from the image reading device part 10, the color information conversion device part 20 finds the hue value H, the saturation value S and the value V of each picture element according to the HSV conversion circuit 21. The color information conversion device part 20 judges whether the color information of the picture element is of an achromatic color or a chromatic color by comparing this found saturation value S with the predetermined threshold $T_S$ at a saturation comparison circuit 22, and outputs "0" for an achromatic color if $S<T_S$ and "1" for a chromatic color if $S>=T_S$. The color information conversion device part 20 judges whether the color information of the picture element is of a background or a character by comparing this found value V with the predetermined threshold $T_V$ at a value comparison circuit 23, and outputs "1" for a character if $V<T_V$ and "0" for a background if $V≧T_V$ An "AND" gate 24 makes a logical product by multiplying the inversion of the output from the saturation comparison circuit 22 outputted from an inverter 25 and the output from the value comparison circuit 23, and outputs "1" for a character 7a and "0" for a background or a character frame 7b, so that a cutout of the character 7a is processed.

The hue value H outputted from the HSV conversion circuit 21 of the color information conversion device part 20 is sometimes of a different chromatic color from the original chromatic color at an image edge part, as described earlier. The embodiment of the processing part for adjusting the hue value of the color image data reading device 1 related to the first invention shown in FIG. 5 shows how the color blur of this chromatic color is adjusted. The process of adjusting the color blur of the chromatic color that this invention executes according to the embodiment shown in FIG. 5, is explained.

After receiving a code for identifying a chromatic color and an achromatic color and the hue value of each picture element read out in a unit of the main scanning line direction from the color information conversion device part 20, a gate circuit 30 executes a process of storing the hue value of each picture element of one main scanning line in a line buffer 31 by outputting the hue value in case of a chromatic color and a zero hue value in case of an achromatic color. After this storing process is completed, a controller 33 reads out the hue values of each picture element from the line buffer 31 one by one and inputs them to a comparator 32. The comparator 32 detects whether these inputted hue values are zero or changing from zero to a value other than zero, or vise versa, and notifies the controller 33 of the detected result.

Upon receipt of a notification that the hue value being inputted from the comparator 32 is zero, the controller 33 stores this value in the memory part at the lowest stage of a five line memory 34 (for storing the hue value of each picture element of five main scanning lines). Meanwhile, upon receipt of a notification that the hue value of the picture element being inputted is detected to have changed to a value other than zero, by transferring the control to a chromatic color replacer 35, the controller 33 replaces the hue value of the subsequent chromatic color picture element (being the chromatic color picture element before the receipt of a notification from the comparator 32 that the hue value has changed to zero and corresponding to the series of chromatic color picture elements explained by FIG. 3) with the hue value without a color blur.

That is, a counter 36 of the chromatic color replacer 35 counts the picture element number of the chromatic color picture element series that must be processed on receipt of the comparison result of the comparator 32 from the controller 33, and a median setting part 37 of the chromatic color replacer 35 finds the hue value of the picture element positioned approximately at the center of the chromatic color picture element series that must be processed by selecting the hue value read out from the line buffer 31 according to the count value of this counter 36.

For instance, when the count value of the counter 36 is "5", the median setting part 37 finds the hue value of the third picture element of the chromatic color picture element series, for which the median setting part 37 comprises e.g. multiple buffers and finds the hue value of the picture element positioned approximately at the center of the chromatic color picture element series by storing a candidate of the hue value of the center position of the chromatic color picture element series in those buffers in accordance with the notching of the count value of the counter 36. When the median setting part 37 finds the hue value of the center position of the chromatic color picture element series because the counter 36 finishes counting, a replacing part 38 of the chromatic color replacer 35 outputs the found hue value of the center position of the count value of the counter 36.

Figure 6:
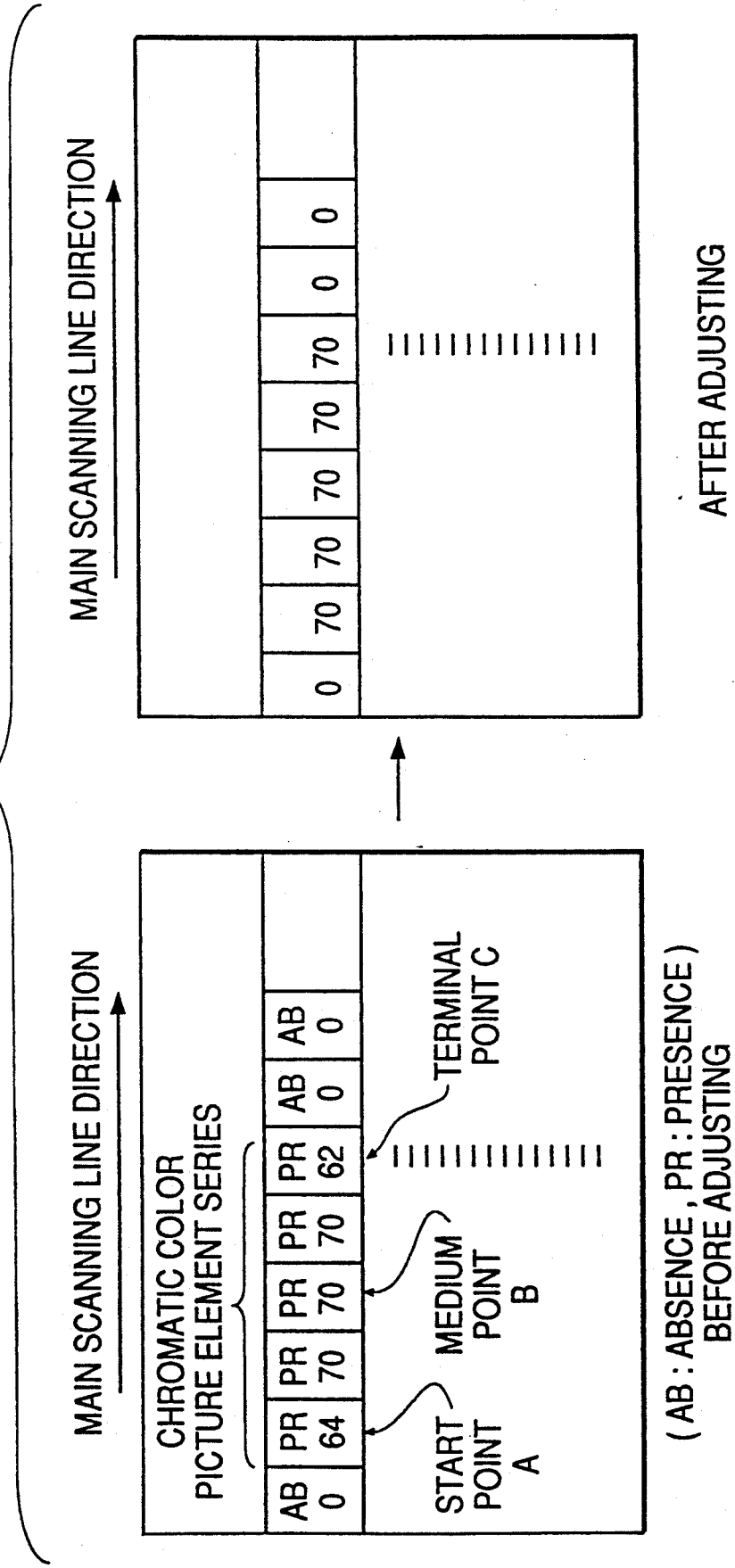
FIG. 6 is an explanatory view of an adjusting process excuted by the chromatic color replacer shown in FIG. 5.

The controller 33 stores this replaced hue value in the memory part of the lowest stage of the five line memory 34. FIG. 6 explains the adjusting process that the chromatic color replacer 35 executes. When a chromatic color picture element series of "64, 70, 70, 70, 62" with at least one "0" before and after the series is stored in the line buffer 31, the counter 36 counts "5". Next, after counting the "5", the median "70" of the chromatic color picture element series is read out and stored five consecutive times as the replacing hue value in the line memory 34 via the controller 33. As a result, the hue value after the adjustment becomes "70, 70, 70, 70, 70" with at least one "0" before and after the series. Thus, the chromatic color replacer 35 realizes an adjustment of the color blur of the chromatic color arising in the main scanning line direction by replacing the hue value of the picture element at an edge part of the chromatic color picture element series to the hue value of the median location of the chromatic color picture element series. The five line memory 34 stores the hue value of the newest main scanning line just read and the hue values of the four consecutive main scanning lines already read, according to the controller 33's actions. After storing the hue values in the memory part of the lowest stage of the five line memory 34, namely, in the memory part for the newest main scanning line, an adder 39 adds the hue values of the five line memory 34 in the picture element unit of the sub-scanning direction by following the directive from the controlling mechanism 50, and stores the added result in a line memory 40.

Figure 7:
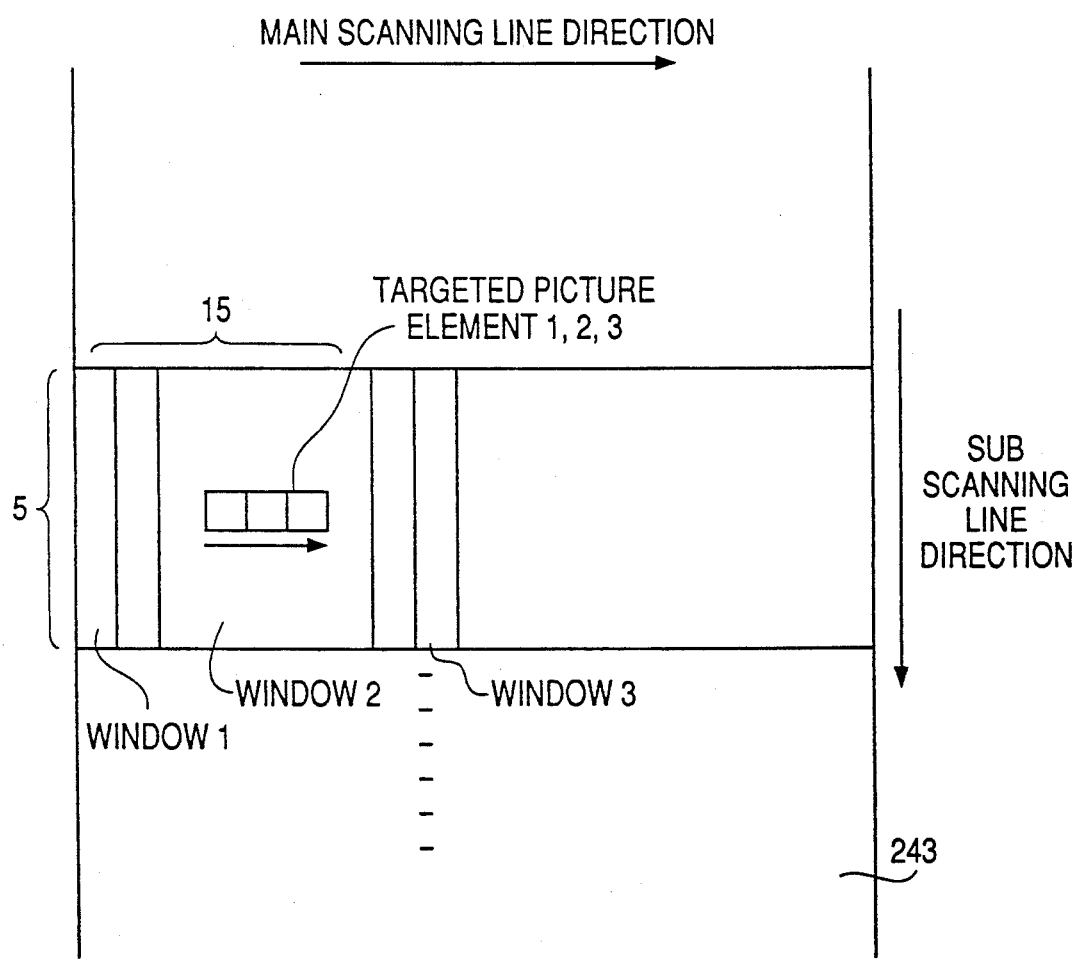
FIG. 7 is an explanatory view of a target picture element and a picture element in the region surrounding the target picture element.

A comparator 41 judges whether the hue value sequentially read out from the five line memory 34 is zero or is a value other than zero. A counter 42 to which the judging result of the comparator 41 is inputted counts the number of chromatic color picture elements positioned near the targeted picture element set in the five line memory 34, according to a reset signal and an enable signal from the control mechanism 50. That is, when a 15×5 window (whose "5" is the line number of the five line memory 34) is centered on the targeted picture element as shown in FIG. 7, the number of the chromatic color picture elements in the window is counted. Here, the control mechanism 50 sets the targeted picture element to be processed sequentially, e.g. from the left of the center (the third line) memory part of the five line memory 34. Also, when the targeted picture element is close to the left end or the right end, the window form is different from 15×5.

When the counter 42 counts the number of the chromatic color picture elements positioned around the targeted picture element, by referring to the line memory 40, an adder 43 computes the grand total of the hue value of the chromatic color picture elements positioned in the region near the targeted picture element (which is the same as the nearby region counted by the counter 42). By dividing this computed value of the adder 43 by the counted value of the counter 42, an averager 44 calculates and outputs the hue value averaged in the region near the targeted picture element By repeating a similar process, the averaged hue value for all targeted picture elements is calculated This averaged hue value absorbs a loss of color balance based on the difference of a picture element or a few picture elements in the sub-scanning line direction. After the averaged hue values are calculated for all the targeted picture elements, by controlling the controller 33 and storing the new main scanning line hue value to the memory part of the lowest stage of the five line memory 34, the control mechanism 50 executes the averaging of the hue value of the targeted picture element of the next main scanning line.

Thus, by replacing the hue value of the picture element at the edge part in the sub scanning line direction with the average of the hue values of the nearby region, the averager 44 realizes an adjustment of the chromatic color blur arising in the sub-scanning line direction.

To summarize, this invention is configured to adjust the chromatic color blur arising in the main scanning line direction according to the processings of the chromatic color replacer 35, as well as to adjust the chromatic color blur arising in the sub-scanning line direction according to the processings of the averager 44.

The present invention should in no way be construed as being limited to the preferred embodiments shown in attached drawings.

Figure 8:
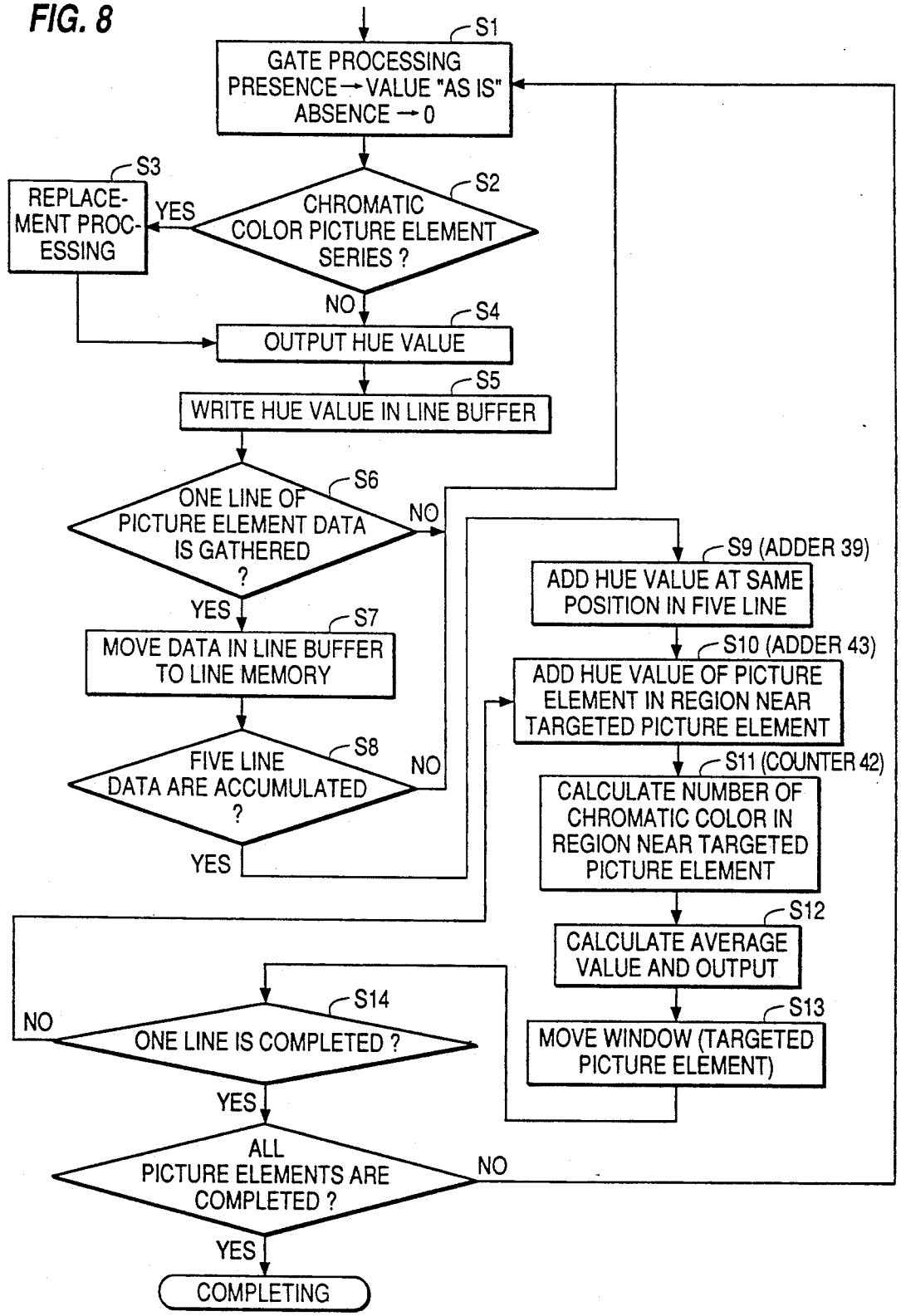
FIG. 8 is a system flow chart of the first embodiment of the present invention.

FIG. 8 is a system flow chart of action processings that are executed when a processor replaces the hue value of the chromatic color picture element series and averages the hue values of the region near the targeted picture element.

When a chromatic/achromatic color identification code and a hue value of a picture element outputted from the color information conversion device part 20 are inputted, the processor executes a gate processing step S1, and sets the hue value of the picture element at either "0" in case of an achromatic color or the inputted hue value in case of a chromatic color.

The processor determines whether the input is of a chromatic color picture element series (S2). If it is (YES), the processor executes the replacement (S3). In determination step S2, if the input is not determined to be of chromatic color, or after replacing S3, the processor outputs a hue value H (S4) and writes the hue value in a line buffer (S5).

In the embodiment described earlier the hue value of the center picture element of a consecutive series thereof is set as the hue value of the series. However, if the processor deems the input to be of a chromatic color picture element series, in replacing S3 as shown in FIG. 8, the third hue value from the beginning of the consecutive picture element series, for example, is set as the hue value of the series. This hue value H is output at S4.

After the hue value is written into the line buffer, the processor determines whether or not one line of picture element data is gathered (S6). If it is not (NO), the processor repeats the steps from S1; if it is, i.e., it is inputted (YES), the processor moves the data in the line buffer to the line memory (S7).

Steps S2 through S6 described earlier are the executions of the processings of one picture element unit in the line direction. After the processings of one line are completed, the processor moves the hue value obtained in the moving S7 and determines whether the five lines of data are accumulated in the line memory (S8). In the embodiment of this invention, the processing of one line in the center is processed in a five-line unit. Thus, right after the processings begin, only the first line of data is stored in the line memory. Then, the second, third, fourth and fifth lines of data are stored in the line memory. Consequently, before the fifth line of data is stored, the five lines of data are judged not to have been accumulated in the judging S8 (NO), and the processings are repeated from S1. When the five lines of data are determined to have accumulated in the determination process S8 (YES), the processor adds the hue values (H) at the same dot position in the five lines (S9), namely, adds five hue values in a vertical direction, to determine the hue value of the picture element on the center line. This adding process S9 corresponds to the adding action of the adder 39. The processor adds the hue values of the picture elements in a region near the targeted picture element, e.g. in the 5×15 region centered around the targeted picture element (S10), and finds the number of chromatic color picture elements in the nearby region around the targeted picture element (S11), and, as the hue value of the targeted picture element, outputs the quotient obtained by dividing the added value computed in the S10 by the number found in step S11. Steps S10 and S11 correspond to the actions of the adder 43 and the counter 42 in FIG. 5.

After step S12, the processor moves its window to the other targeted picture element and its surrounding region (S13). If movement to the next targeted picture element S13 is possible, the processor determines that a subsequent line of data has not been processed (NO) in the determination step (S14) and repeats the processings from step S10, to process the next targeted picture element. When one more line of data has been processed, the processor determines whether or not all the picture elements have been processed. If they have not (NO), a subsequent line still exists, so the processor again repeats the processings from step S1. If they have all been processed (YES), the processor terminates all further processings.

The processings of the processor heretofore described, produce the same result as the embodiment shown in FIG. 5. To summarize, the chromatic color blur occurring at the time reading color image data is processed, is adjusted in the main scanning line direction and the sub-scanning line direction.

Figure 9A:
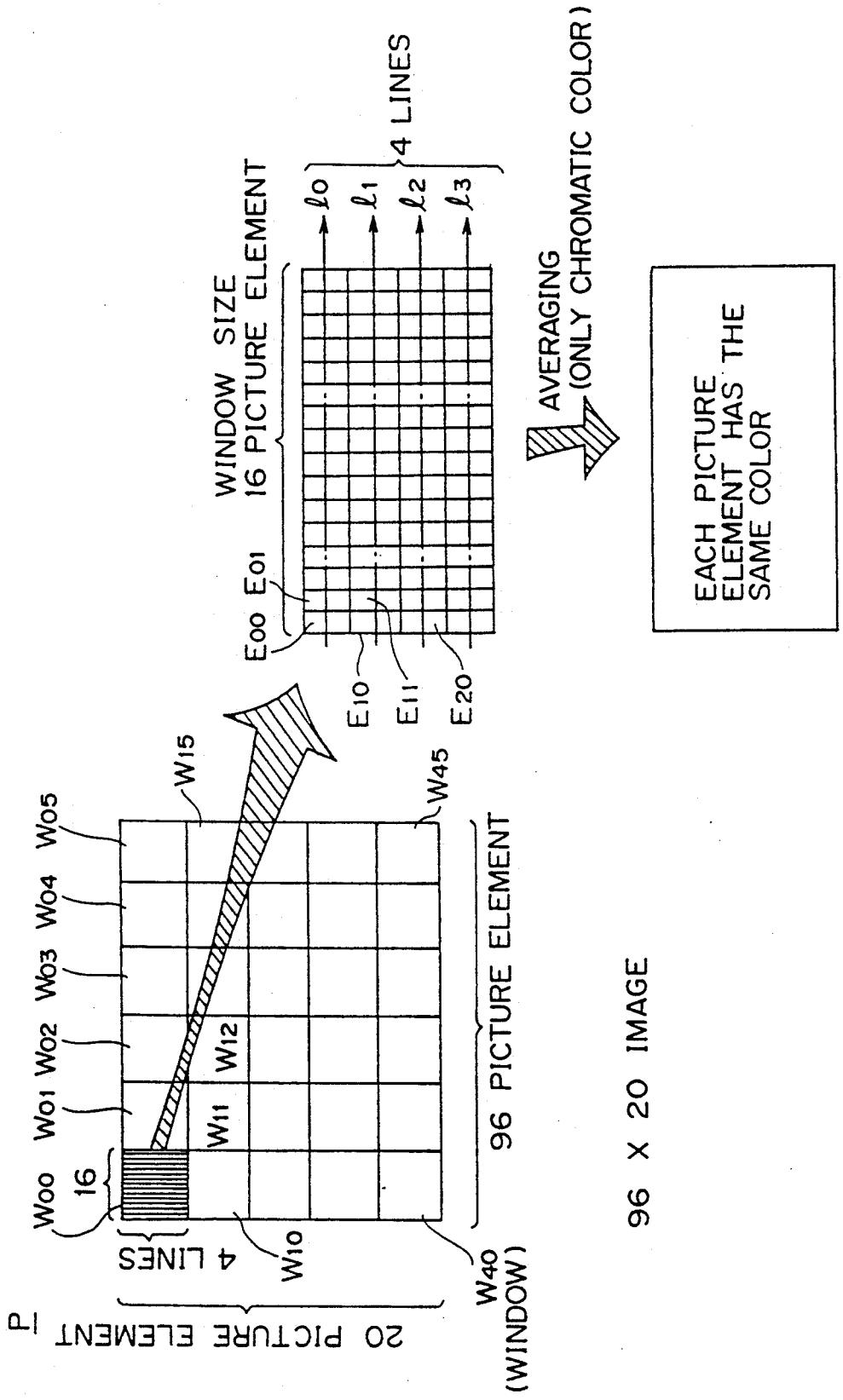
FIGS. 9A and 9B show explanatory views of another principle of the present invention.
Figure 9B:
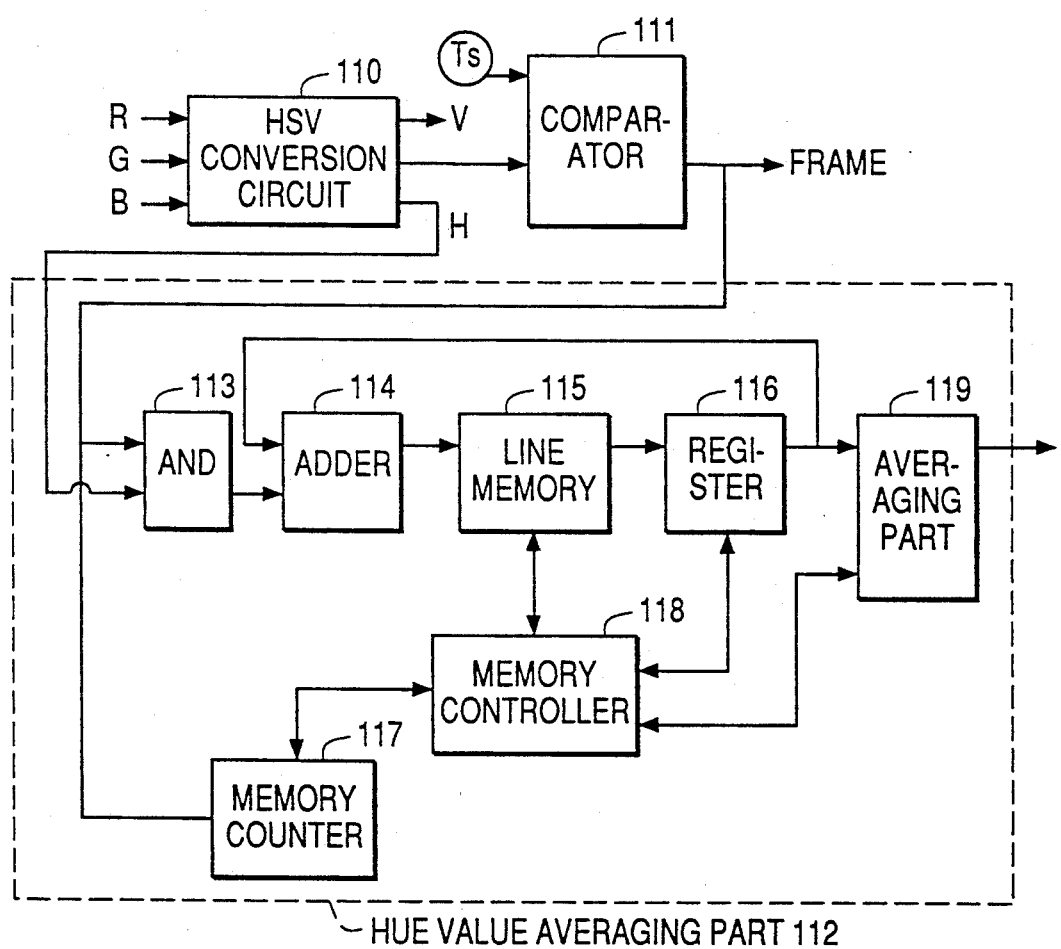

FIGS. 9A and 9B show the principle of the second invention. As shown in FIG. 9A, the second invention divides an image region P into windows $W_{00}$ through $W_{45}$, e.g., comprising sixteen (16) picture elements in a row and four (4) picture elements in a column for averaging the hue value of the chromatic color part in each window. FIG. 9A shows the condition in which 96×20 picture elements are divided into thirty (30) 6×5 windows.

As shown in FIG. 9B, for this kind of a hue value averaging, the second invention is configured with an HSV conversion circuit 110 for converting RGB signals into HSV signals, a comparator 111 for comparing the S signal with a threshold $T_S$ for separating it into a chromatic color and an achromatic color and a hue value averaging part 112 for averaging the chromatic color hue value within a window. This hue value averaging part 112 comprises an "AND" gate 113, an adder 114, a line memory 115, a register 116, a memory counter 117, a memory control part 118, and an averaging part 119.

Now, the image region P shown in FIG. 9A is scanned in the direction from the window $W_{00}$ to $W_{05}$, i.e. in the main scanning direction. Since a window is scanned by four lines at this time, windows $W_{00}$ through $W_{45}$ are scanned by scanning lines $l_0$ through $l_3$.

The RGB signals obtained from the scanning by scanning line $l_0$ is input to the HSV conversion circuit 110 shown in FIG. 9B and converted into HSV signals by each picture element. The S signal is inputted to the comparator 111, which outputs "1" only for the input of the picture element part that is larger than the threshold $T_S$, i.e., the picture element is judged to be of a chromatic color. Therefore, the "AND" gate 111 is turned ON, and the hue value H of this chromatic color is inputted to the adder 114. One input of the adder 114 is "0" for the first line $l_0$. Since the line memory 115 has a memory capacity for one line of picture elements in the image region P, the hue value H of the chromatic color corresponding to the picture elements of windows $W_{00}$ through $W_{05}$ is stored in the line memory 115. At this processing in the line $l_0$ direction, the memory counter 117 counts the number of picture elements of the output "1" from the comparator 111. At this time, the memory control part 118 reads and keeps the count value of the memory counter 117 by each of the 16 picture elements of the line $l_0$.

Next, a similar processing is performed to the windows $W_{00}$ through $W_{05}$ in the line $l_1$ direction, when the line memory 115 keeps the hue value H for the one line picture element obtained from the processing in the line $l_0$ direction. Accordingly, as for the processing in the line $l_1$ direction, the hue value H of picture element $E_{10}$ shown in FIG. 9A is supplied to the adder 114 through the "AND" gate 113, when "1" is outputted for picture element $E_{10}$ from the comparator 111. Then the hue value H of picture element $E_{00}$ of the line memory 115 is temporarily stored in the register 116 and transmitted to the adder 114. Thus, the adder 114 adds the hue values H of picture elements $E_{00}$ and $E_{01}$, and this value is stored in the line memory 115. The adding processing with the line $l_0$ is performed by scanning in the line $l_1$ direction in this manner. Then, by processing in the line $l_2$ direction, the hue value H of picture element $E_{20}$ is transmitted to the adder 114 through the "AND" gate 113 that adds the current hue value H of picture elements $E_{00}$ and $E_{01}$. When the scanning in the line $l_3$ direction is thus performed, the line memory 115 keeps these four added results according to the scanning position correspondence of the picture elements. Then, the memory control part 118 keeps the data corresponding to the number of chromatic color picture elements of each block for scanning lines $l_0$ through $l_3$. The memory control part 118 outputs to the averaging part 119 the hue value H kept in the line memory 115 corresponding to each window and the data depending on the number of chromatic color picture elements. As a result, the averaging part 119 computes the average of the hue values H of each window.

The average hue value of each window is calculated by the second invention, and the chromatic color part within the same window is replaced with this average value, thus averaging the hue value. A color of a high hue value existing discretely at a certain edge part is diluted and the color distribution is narrowed. Hence, the color separation with a threshold becomes easier.

FIGS. 10, 11A, 11B, 11C and 11D explain a second embodiment of the present invention.

Figure 10:
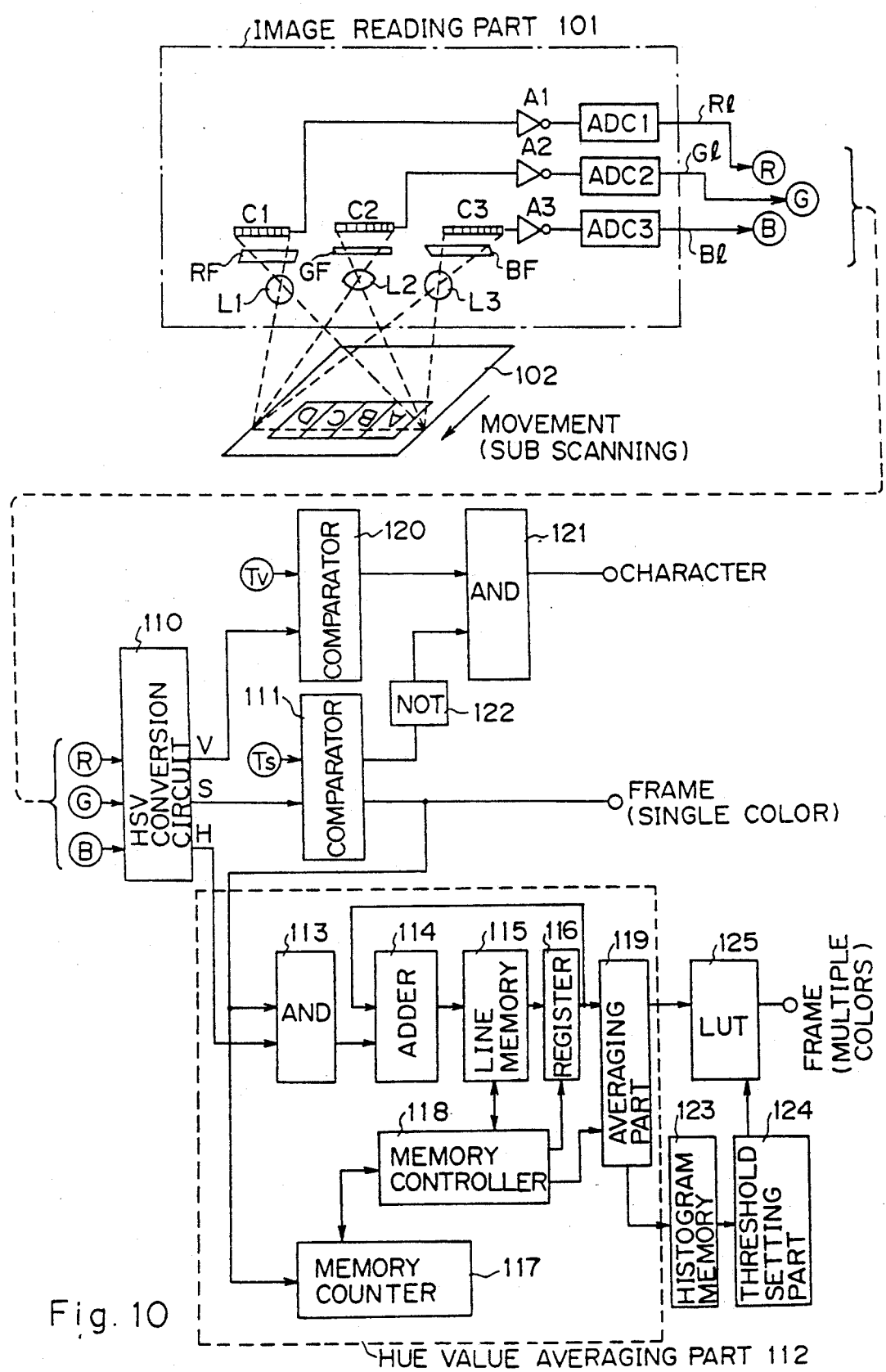
FIG. 10 shows a block diagram of the second embodiment of the present invention.
Figures 11A, 11B:
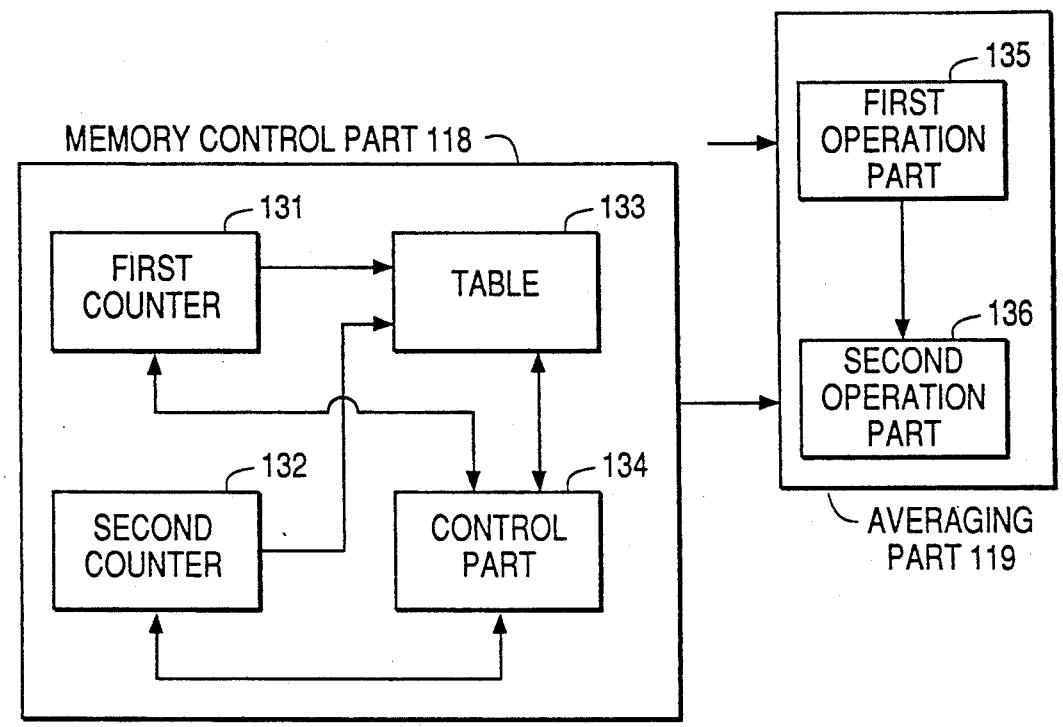
FIG. 11A shows a block diagram of the memory control part and the averaging part in the second embodiment shown in FIG. 10.
FIG. 11B shows a content of the table.
Figure 11C:
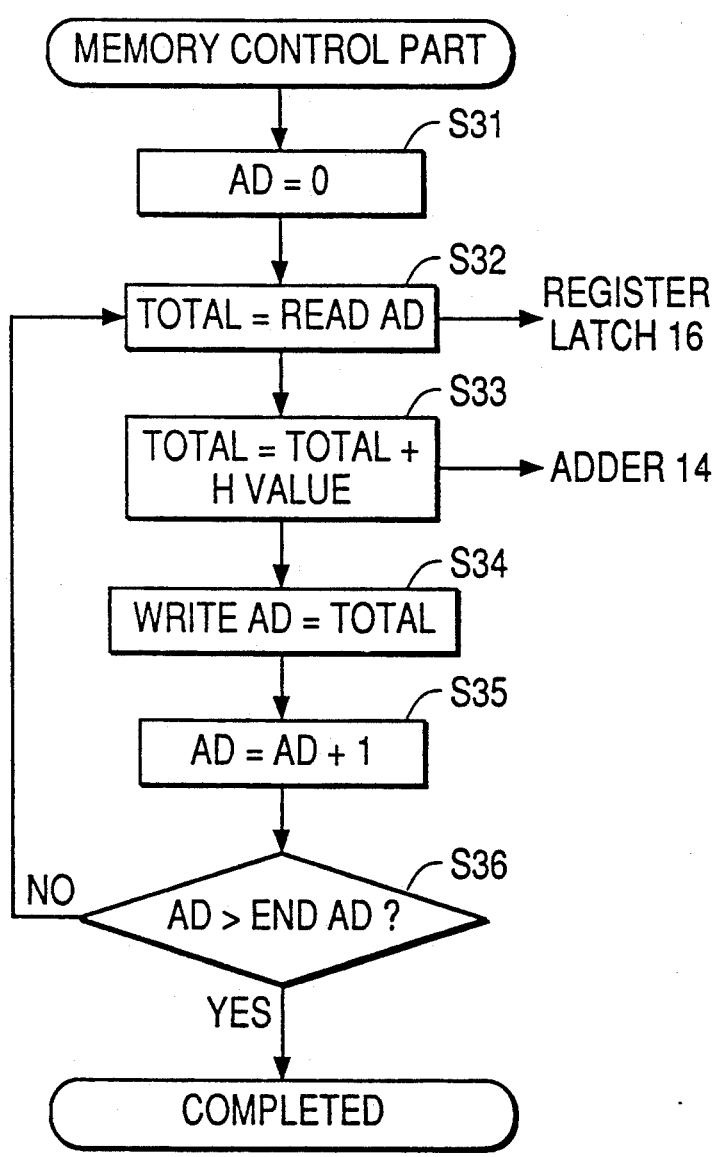
FIG. 11C shows an action flowchart of the memory control part in the second embodiment shown in FIG. 10.
Figure 11D:
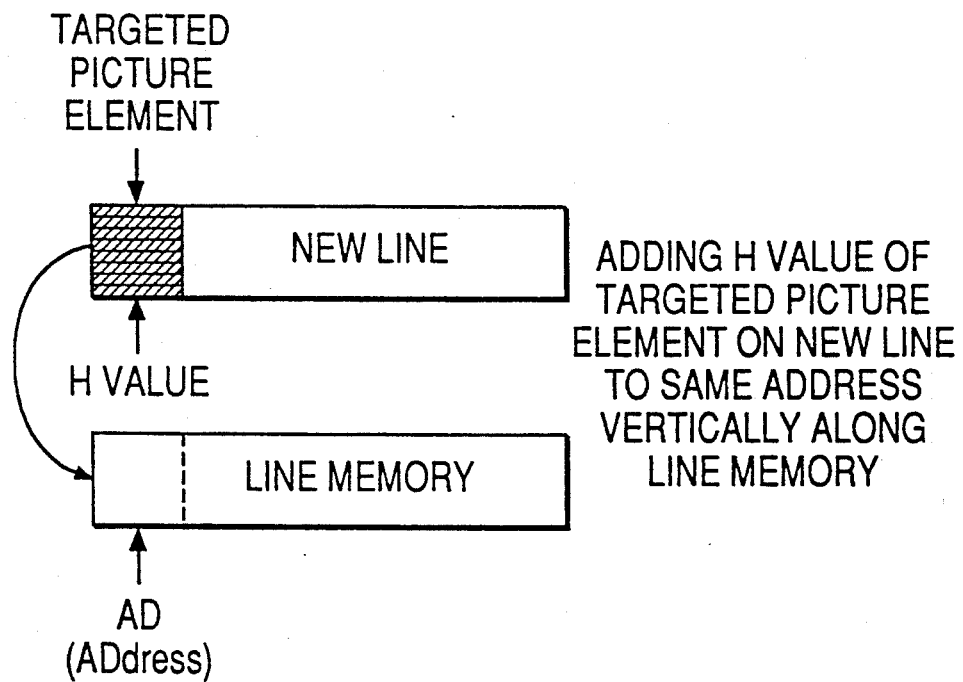
FIG. 11D is an explanatory view of a memory access in the second embodiment.

FIG. 10 shows a configuration of the second embodiment of this invention. FIG. 11A shows the details of the memory control part 118 and the averaging part 119. FIG. 11B shows the details of the table. FIG. 11C shows an action flow chart of the memory control part 118. FIG. 11D explains the memory access.

Figure 1A:
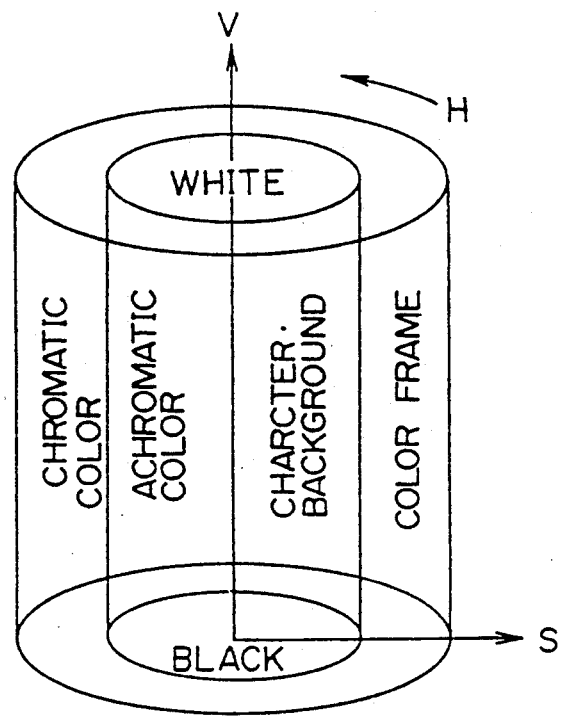
FIGS. 1A and 1B are explanatory views of HSV display system.
Figure 1B:
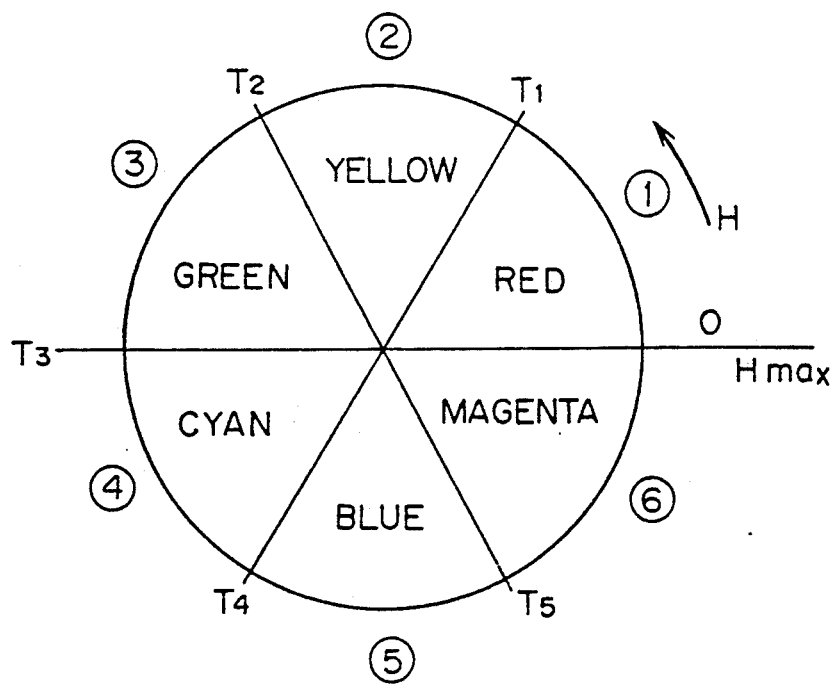
Figure 2:
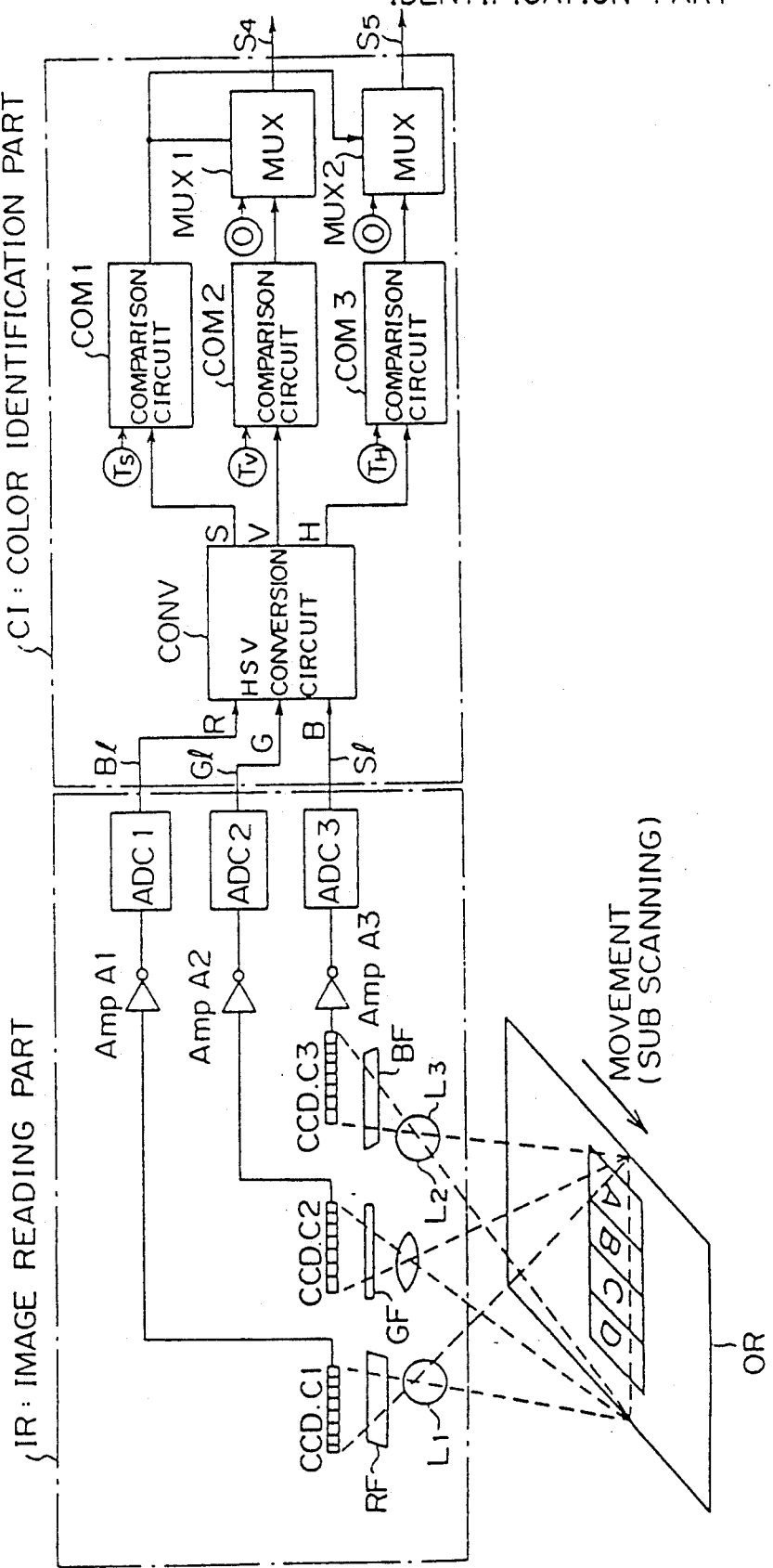
FIG. 2 is a block diagram of a prior art system.

Numbers in FIG. 10 which are the same as those in FIG. 9, indicate the same parts. 101 is an image reading part corresponding to the image reading part IR in FIG. 2. 102 is an original such as a colored slip, corresponding to the original OR in FIG. 7. 120 is a comparator for comparing the V signal that indicates the value with a threshold $T_V$, and outputs "1" if the V signal is lower than the threshold $T_V$. 121 is an "AND" gate that outputs "1" because an inverter 122 outputs "1" when a comparator 120 outputs "1" and the comparator 111 outputs "0" by detecting an achromatic color. In other words, this "AND" gate 121 outputs a character signal "1".

123 is a histogram memory for creating a hue histogram. The hue values H averaged by the averaging part 119 of the window size (16×4 in the example shown in FIG. 9A) are outputted to the histogram memory 123. 124 is a threshold setting part that sets a threshold in the valley part of the hue histogram and creates a lookup table 125, based upon the histogram kept in the histogram memory 123. When the hue value H passed through the averaging part 119 refers to this lookup table 125, from the second page of the original, the color (color number) is determined.

As explained earlier, this invention calculates the hue value average of each chromatic color part, for which it is necessary to find both the number of the picture elements of the chromatic color part in each window and the sum of the hue values H of this picture element part.

As shown in FIG. 11A, for example, the memory control part 118 comprises a first counter 131 for counting the number of picture elements in a row of a window, which is four (4: 0 through 3) in this case; a second counter 132 for counting the number of picture elements in a column of a window, which is sixteen (16: 0 through 15) in this case; a table 133; and a control part 134. Needless to say, the first counter 131 and the second counter 132 synchronize their counting actions with the scanning of lines $l_0$ through $l_3$.

The memory counter 117 to which "1" is outputted for a chromatic color picture element from the comparator 111, counts the number of chromatic color picture elements. When line $l_0$ is scanned, the first counter 131 counts zero (0). The second counter 132 is invoked from zero, and when it has counted 15, the control part 134 reads the value of the memory counter 117, writes the counted value in the table 133 and resets the memory counter 117. Accordingly, as shown in FIG. 11B, based on the scanning of the scanning line $l_0$ windows $W_{00}$, $W_{01}$, etc. in FIG. 9A, the number of chromatic color picture elements $A_0$ of the first sixteen (16) picture elements counted by the memory counter 117 is written in a first count compartment $C_0$, and the the number of chromatic color picture elements $B_0$ of the second sixteen (16) picture elements counted by the memory counter 117 is written in a second count compartment $C_1$. Thus, when the number of windows horizontal to scanning line $l_0$ is N, N pieces of data ($A_0$ through $N_0$) regarding the scanning line $l_0$ are written in count compartment $C_o$ through $C_{N-1}$. Similarly, the count value of the chromatic color picture elements for each of the scanning lines $l_1$ through $l_3$ is written in respective count compartments, and data such as those shown in FIG. 11B are obtained. An address for these data written into the table 133 is designated when the first counter 131 specifies $l_0$ through $l_3$ and the second counter 132 specifies $C_0$ through $C_{N-1}$.

When a window of one horizontal line is scanned a predetermined number of times (four in the example of this embodiment) to compute the number of chromatic color picture elements, the control part 134 sequentially reads out the data $A_0$ through $A_3$ in the count compartment $C_0$ for scanning lines $l_0$ through $l_3$ from the table 133 and outputs them sequentially to a second operation part 136 of the averaging part 119. Then, the second operation part 136 calculates the sum of $A_0$ through $A_3$ and temporarily keeps it. At this time, the memory control part 118 sequentially outputs the data of the sixteen (16) picture elements corresponding to the window $W_{00}$ from the line memory 115 through the register 116 to a first operation part 135, which is performed under the control of the control part 134 of the memory control part 118. As in the explanation of FIG. 9, since each sum of hue values H of the vertical picture elements by scanning line $l_0$ through $l_3$ is written to each compartment of the line memory 115 at this time, by having the first operation part 135 add them together, a sum of the hue values H at the window $W_{00}$ is obtained.

The control actions at the memory control part 118 are explained by referring to the chart shown in FIG. 11C.

When the hue value H of a line's head end is inputted through the "AND" gate 113 to the adder 114, the memory control part 118 sets an address value AD to zero (0) (S31), and reads the sum of the hue values H stored in the address AD of the line memory 115 (S32). This read value is stored in the register 116 and inputted to the adder 114. The adder 114 adds the hue value H of a line's head end and the sum (total) stored in the register 116 (S33) and stores the result in the position of the .read address AD (S34). That is, as shown in FIG. 9D, the hue value H of the targeted picture element of a new line is added to the same address of the line memory (a position on a line of the targeted picture element). The memory control part 118 increments the address AD (S35), and it is judged whether the read address AD is greater than a final value END AD (S36). If it is not, steps from the reading S32 are repeated. After all the other steps, the judging step S36 terminates the addition to a line, if the address AD becomes greater than the final value END AD.

In the second embodiment of the present invention, since a window comprises 4 lines × 16 picture elements, by repeating the adding actions four times for the four lines, an adding operation for one window is performed. By adding sixteen (16) pieces of these results horizontally in the averaging part 135, the sum of the hue values H at $W_{00}$ is obtained.

The sum of this hue values H is outputted to the second operation part 136 and then divided by ($A_0+A_1+A_2+A_3$) to obtain the average of the hue values H of the chromatic color picture elements over the threshold $T_S$.

Next, the control part 134 outputs the hue values H of the sixteen (16) picture elements corresponding to the window $W_{01}$ from the data memory 115 of the count compartment $C_1$ by the table 133 to the first operation part 135, and adds them to obtain the sum of the hue values H of the chromatic color picture elements in the window $W_{01}$. This sum is outputted to the second operation part 136, where it is divided by ($B_0+B_1+B_2+B_3$) to obtain the average of the hue values H of the chromatic color picture elements over the threshold $T_S$.

When the average value for the windows $W_{00}$, $W_{01}$, etc. has been computed, the scan data of the next line's windows $W_{10}$, $W_{11}$, $W_{12}$, etc. in the scanning line $l_0$ through $l_3$ are outputted sequentially, to which similar processings are performed to obtain the average of the hue values H for each window.

When the added values of the four lines are sorted in the line memory 115, a new input of the hue value H is stopped. Then the average for the windows $W_{00}$, $W_{01}$, etc. is calculated, as described earlier. In the reading of a first training original, the window size (16×4 in this example) of the averaged value is outputted to the histogram memory 123 of the histogram creating part. After the first four scanning lines have been averaged, the next four lines are similarly averaged, and windows $W_{10}$, $W_{11}$, $W_{12}$, etc. are averaged. After the entire screen has been averaged, the hue histogram is created in the histogram memory 123. The threshold setting part 124 sets a threshold in the valley part of the hue histogram, based on the histogram memory 123 for creating the lookup table 125. After the second original passes through the averaging part 119, the color is determined by referring to the lookup table 125. Since the histogram creation and the lookup table are not closely related to the objective of the second invention, their detailed explanation is omitted.

Figure 12:
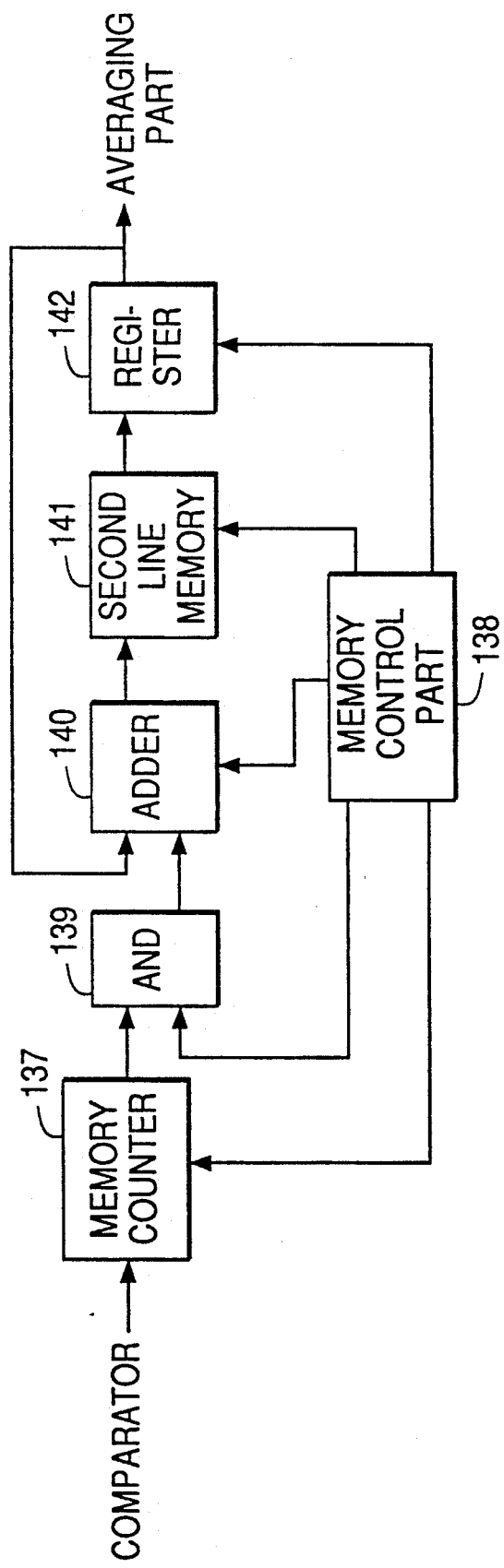
FIG. 12 is a block diagram of another embodiment of the present invention.

In the second embodiment, the chromatic color picture element number computing means in a window is not limited to the means shown in FIGS. 10, 11A, 11B, 11C and 11D, but instead can be a means such as that shown in FIG. 12.

That is, the memory counter 137 counts the number of chromatic color picture elements in a window for each scanning line. Then the memory control part 138 outputs "1" for every sixteen (16) picture elements to the "AND" gate 139 and turns them ON. The "AND" gate 139 outputs $A_0$, $B_0$, ... $N_0$, as shown in FIG. 11B, regarding the scanning line $l_0$. The outputs are sequentially written in a second line memory 141. The second line memory 141 has compartments whose number is equal to the number of horizontal windows. That is, in FIG. 11B, there are N compartments of $C_0$ through $C_{N-1}$.

When a scanning with scanning line $l_1$ is performed, the data $A_0$ in the first compartment $C_0$ of the second line memory 141 are temporarily set in the register 142, and $A_1$ counted by the memory counter 137 is inputted through the "AND" gate 139 to the adder 140, which calculates the sum of the $A_0$ set in the register 142 and this $A_1$. This sum is set in the compartment $C_0$ of the second line memory 141.

After these controls are performed on the scanning lines $l_0$ through $l_3$, the sum ($A_0+A_1+A_2+A_3$) is written in the compartment $C_0$ of the second line memory 141, the sum ($B_0+B_1+B_2+B_3$) is written in the compartment $C_1$ of the second line memory 141, and the sum ($N_0+N_1+N_2+N_3$) is written in the compartment $C_{N-1}$ of the second line memory 141. As a result, since the second line memory 141 thus stores the number of chromatic color picture elements of each window, when the controls by the scanning lines $l_0$ through $l_3$ are performed, the second operation part 136 of the averaging part 119 finds the average by only performing the division described earlier.

It is desirable to configure an embodiment of the second invention with as small a memory as possible. Thus, all the processings, including the HSV signal conversion and the averaging, are performed in a line unit.

Although the window size in the example explained is of 16×4 picture elements, it is by no means limited to this example.

The first embodiment adjusts a chromatic color blur occurring when color image data are read both in the main scanning line and sub-scanning line directions. Hence, the color image is accurately extracted.

There are a few picture elements with a color blur at their edge parts. Thus, when a colored slip is read and a monocolor character and color form information are separated, the second embodiment abates the effects of the color blur by averaging the chromatic color in each window comprising multiple picture elements. This ensures that the accuracy of color identification is maintained and the color form information is used as character cutout information.

The configuration is made so that a character and a form are distinguished by their saturation and value only. Thus, when it is not necessary to identify the color of a form, a major improvement in the processing speed is expected.

What is claimed is:

1. A color image data processing apparatus for processing hue values of picture elements read out sequentially, said apparatus comprising:
   chromatic color detection means for detecting hue values of picture elements of a chromatic color picture element series in a main scanning line having a consecutive succession of chromatic color picture elements including edge picture elements;
   replacing means for replacing the hue value of each picture element of the chromatic color picture element series including the edge elements with a hue value of a picture element located approximately at the center position of the picture elements in the chromatic color picture element series; and
   processing means for processing the hue values of the picture elements.

2. The color image data processing apparatus according to claim 1,
   wherein said processing means comprises averaged hue value switching means for switching the hue values of the picture elements output from said chromatic color detection means and said replacing means with an average of the hue values of said picture elements and of other picture elements located in a nearby region.

3. A color image data processing apparatus for processing hue information of picture elements read out sequentially, said apparatus comprising:
   a chromatic color detection means for detecting a chromatic color picture element series that is a consecutive succession of chromatic color picture elements in a main scanning line, wherein said chromatic color detection means comprises
      a first detecting means for detecting a change in a picture element whose data have been inputted sequentially according to the main scanning line, from an achromatic color to a chromatic color,
      a second detecting means for detecting a change in a picture element whose data are inputted sequentially according to the main scanning line, from a chromatic color to an achromatic color, and
      a counter means for starting a count of a clock means for indicating the inputted picture element according to a result of said first detecting means and for stopping the count according to a result of said second detecting means;
   a replacing means for replacing a hue value of each picture element of the chromatic color picture element series with the hue value of a picture element located approximately at the center position of the detected chromatic color picture element series to produce a replaced hue value; and
   an average hue value switching means for switching the replaced hue value of each of the picture elements with an average of the replaced hue value of each picture element and picture elements located in a nearby region of said each picture elements.

4. A color image data processing apparatus for processing hue information of picture elements read out sequentially, said apparatus comprising:
   a chromatic color detection means for detecting a chromatic color picture element series that is a consecutive succession of chromatic color picture elements in a main scanning line, wherein said chromatic color detecting means comprises
      a first detecting means for detecting a change in a picture element whose data have been inputted sequentially according to the main scanning line, from an achromatic color to a chromatic color,
      a second detecting means for detecting a change in a picture element whose data are inputted sequentially according to the main scanning line, from a chromatic color to an achromatic color, and
      a counter means for starting a count of a clock means for indicating the inputted picture element according to a result of said first detecting means and for stopping the count according to a result of said second detecting means;
   a replacing means for replacing a hue value of each picture element of the chromatic color picture element series with the hue value of a picture element located approximately at the center position of the detected chromatic color picture element series to produce a replaced hue value, said replacing means comprising
      a hue value setting means for setting a hue value of a picture element positioned at a location of a half of the value counted by said counter from the picture element on the main scanning line from which said counter starting the counting as the hue value of said chromatic color picture element series, and
      a hue value replacing means for replacing the hue value of said chromatic color picture element series with the hue value set by said hue value setting means; and
   an averaged hue value switching means for switching the replaced hue value of each of the picture elements with an average of the replaced hue value of each picture element and picture elements located in a nearby region of said each picture elements.

5. The color image data processing apparatus according to claim 2, wherein said averaged hue value switching means comprises:
   a line memory means for memorizing the data for n main scanning lines,
   an average computing means for computing the average of the hue value of the n×m picture elements in said line memory necessary for one window.

6. The color image data processing apparatus as in claim 1,
   wherein said chromatic color detection means comprises HSV conversion means for outputting the hue value and a saturation value for each picture element; and
   wherein said processing means comprises hue averaging means for averaging the hue values output from said chromatic color detection means and said replacing means within a window comprising multiple picture elements including edge elements of an image.

7. A color image data processing apparatus according to claim 1,
wherein said chromatic color detection means comprises HSV conversion means for ouputting the hue value and a saturation value for each picture element; and
wherein said processing means comprises:
hue averaging means for calculating a hue average of the hue values of picture elements whose saturation is over a certain threshold, in a window being one of a plurality of multiply divided regions of an image; and
conversion means for converting the hue of the picture elements whose saturation is over said certain threshold into the average of the hue values calculated by said hue averaging means.

8. The color image data processing apparatus according to claim 7, wherein said hue averaging means comprises:
comparison means for comparing the saturation value outputted from said HSV conversion means with a predetermined saturation value to determine if the outputted saturation value is smaller or larger than the predetermined saturation value;
gate circuit means for outputting O or the hue value outputted from said HSV conversion means, respectively when said comparing means determines that the outputted saturation value is smaller or larger than the predetermined saturation value;
accumulator means for accumulating hue values outputted from said gate circuit means to provide an accumulated sum;
counter means for counting a number of picture elements whose saturation values are greater than the predetermined saturation value; and
operation means for dividing the accumulated sum of said accumulator means by the count value of said counter means to produce the hue average for the window.

9. The color image data processing apparatus according to claim 8, wherein said accumulator means comprises:
adder means for adding an output from said gate circuit means inputted to a first input terminals to a stored hue value inputted to a second input terminal;
line memory means, having a memory capacity for one scanning line of picture elements of an image, for memorizing the output from said adder means corresponding to the location of the picture element in the scanning line and
register means for storing the hue value of the picture element corresponding to the output from the gate circuit means as a stored hue value and for inputting the stored hue value to the second input terminal of said adder means.

10. The color image data processing apparatus according to claim 2, wherein said replacing means comprises:
first edge detecting means for detecting a first edge picture element in the chromatic color picture element series;
second edge detecting means for detecting a second edge picture element in the chromatic color picture element series;
counter means for counting picture elements from the first edge picture element to the second edge picture element to provide a count value; and
median hue value determining means for setting the median hue value as the hue value of a picture element at a location in the chromatic color picture element series one half of the count value counted by said counter means.

* * * * *

UNITED STATES PATENT AND TRADEMARK OFFICE
CERTIFICATE OF CORRECTION

PATENT NO. : 5,220,620

DATED : June 15, 1993

INVENTOR(S) : Yasuhiko NAKANO, et al.

It is certified that error appears in the above-identified patent and that said Letters Patent is hereby corrected as shown below:

Col. 1,  line 5, "07,593,953" should be --07/593,953--.

Col. 2,  line 22, "a image" should be --an image--.

Col. 6,  line 3, "value" should be --values--;

line 62, "$V \geq T_v An$" should be --$V \geq T_v$. An--.

Col. 8,  line 63, "element By" should be --element. By--;

line 65, "calculated The" should be --calculated. This --.

Col. 9,  line 9, "sub scanning" should be --sub-scanning--.

Col. 18, line 12, "terminals" should be --terminal--.

Signed and Sealed this

Twenty-sixth Day of July, 1994

Attest:

BRUCE LEHMAN

*Attesting Officer*     *Commissioner of Patents and Trademarks*